United States Patent [19]

Girondi

[11] Patent Number: 4,950,400
[45] Date of Patent: Aug. 21, 1990

[54] DISPOSABLE OIL FILTER UNIT WITH TRIPLE FILTRATION

[75] Inventor: Giorgio Girondi, Mantova, Italy

[73] Assignee: Universal Filter Italiana S.p.A., Verona, Italy

[21] Appl. No.: 329,412

[22] Filed: Mar. 24, 1989

[30] Foreign Application Priority Data

May 10, 1988 [IT] Italy .................. 46845 A/88

[51] Int. Cl.$^5$ .................................................. B01D 35/02
[52] U.S. Cl. ..................... 210/335; 210/342; 210/437; 210/440; 210/489; 210/492; 210/DIG. 17
[58] Field of Search .................. 210/315, 323.1, 323.2, 210/440, 441, 442, 443, 444, 487, 488, 489, 490, 492, 335, 337, 338, 507, 508, 342, 437, 491, 496, 493.5, DIG. 17; 123/196 A; 184/6.24

[56] References Cited

U.S. PATENT DOCUMENTS 4,655,914 4/1987 Wada ...................... 210/444

FOREIGN PATENT DOCUMENTS

| DT 3227889 | 2/1983 | Fed. Rep. of Germany ... 210/493.5 |
| SU 1337536 | 9/1987 | U.S.S.R. ........................... 184/6.24 |
| 826114 | 12/1959 | United Kingdom ............... 210/315 |
| 1124735 | 8/1968 | United Kingdom ............... 210/489 |

Primary Examiner—W. Gary Jones
Assistant Examiner—Matthew O. Savage
Attorney, Agent, or Firm—Birch, Stewart, Kolasch & Birch

[57] ABSTRACT

A disposable oil filter unit with triple filtration characterized by comprising, within a closed cup-shaped container (1), two filter cartridges (3) and (2) which filter radially from the outside towards the center and are disposed in parallel with regard to the traversing oil flow, and of which the first filter cartridge (3), which is of finer porosity, is surrounded by a third concentric cartridge (33) disposed in series with filter cartridge and having a coarser porosity than the second cartridge.

9 Claims, 2 Drawing Sheets

4,950,400

DISPOSABLE OIL FILTER UNIT WITH TRIPLE FILTRATION

BACKGROUND AND SUMMARY OF THE INVENTION

The present invention relates to a disposable unit for filtering lubricating oil in internal combustion engines, and in particular in diesel engines. For filtering lubricating oil in such engines, disposable filter units are known consisting of a cup-shaped container containing one or more filter cartridges, which is arranged to be screwed directly onto the engine block to receive the oil to be filtered from the lubricating oil pump and feed it to the various lubrication points provided in the engine.

The most simple filters of this type are the so-called full-flow filters, i.e. filters containing a single oil cartridge which is traversed by the whole throughput made available by the lubricating oil pump, and which feeds all the filtered oil to the lubricating points provided in the engine. These filters have operational limitations derived from their intrinsic method of operation. In this respect, the filtering efficiency of said filters depends on the filter area and on the porosity of the filter material, whereas their life expectancy is inversely proportional to this porosity.

Thus to obtain a filter having an acceptable life, large-surface medium-porosity filter cartridges must be used but these have the defect of a low initial filtering efficiency which increases proportionally with time until they are completely clogged. On the other hand, reducing the filter material porosity leads to a shortening of the filter life and requires a too high lubricating oil pump power, whereas increasing the porosity on the one hand increases the filter life by delaying its complete clogging but on the other hand lowers the filtering efficiency during the initial operating period of the filter.

To obviate these drawbacks, which are obviously the result of a compromise between the requirement of engine protection on the one hand and economy and small overall size of the filter unit on the other hand, so-called double filtration units have been used. These latter filters, which are also known as mixed-circuit filters, provide a better filtration than that obtainable with the aforesaid full-flow filters. They consist of a casing housing two filter cartridges arranged in parallel to receive the oil to be filtered from one and the same compartment, but feed the filtered oil to two different destinations. Specifically, the larger filter cartridge, which is also that of coarser porosity, feeds the filtered oil directly to the engine users, whereas the smaller filter cartridge of finer porosity, used for so-called fine filtering, feeds the oil directly into the engine sump through separate ducts. Thus most of the oil passes through the coarser porosity filter cartridge to be fed to the lubrication points provided in the engine, whereas a smaller fraction of the oil is recycled to the sump with all impurities completely removed. Statistically, this continuous mixing in the engine sump of a small throughput of highly filtered oil with a larger throughput of normally filtered oil greatly increases the average degree of oil filtration.

This type of filter, known as a mixed-circuit filter, has however the serious drawback that it can be fitted only to engines designed for this purpose. In this respect, at the point where the filter unit is screwed on, there must be a duct provided for recirculation directly into the sump, a feed duct to the various lubrication points and a duct for oil feed to the filter. These filters cannot therefore be applied to engines which do not possess a circuit for recirculating part of the oil directly to the engine sump. To obtain the same filtering efficiency without too much complication in engines not designed for mixed-circuit filters, an attempt has been made to fit into one and the same filter units two cartridges of different porosity operating in parallel and feeding into the same lubrication circuit feed duct. However, this attempt has proved ineffective because the filter cartridge of finer porosity is the first to become clogged and after a certain period of operation becomes completely inefficient, making the entire unit ineffective.

The object of the present invention to provide a filter unit which combines the efficiency of mixed-circuit filter units with the simplicity of application of full-flow filter units, and which can be applied both to engines designed to receive full-flow filter units and to engines designed to receive mixed-circuit filter units.

This is attained by a filter unit using two filter cartridges of different porosity operating in parallel, of which at least one, that of the smaller filtering area and finer porosity, is arranged in series with and downstream of a third filter cartridge of coarser porosity.

BRIEF DESCRIPTION OF THE DRAWINGS

The merits and constructional and operational characteristics of the present invention will be more apparent from the detailed description given hereinafter with reference to the figures of the accompanying drawing which illustrate a preferred embodiment of the invention by way of non-limiting example.

DETAILED DESCRIPTION OF THE INVENTION

Figure 1:
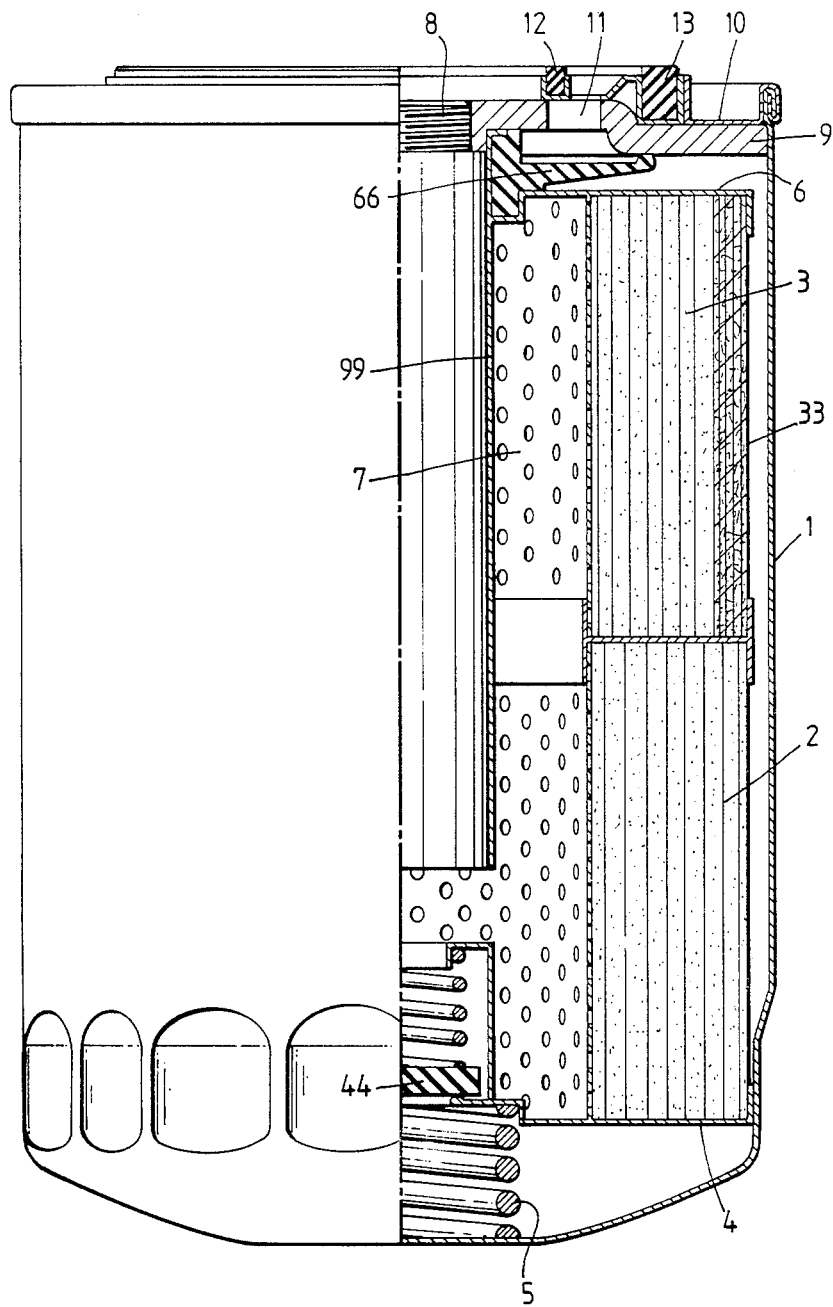
FIG. 1 shows a filter unit according to the invention in partial section.
Figure 2:
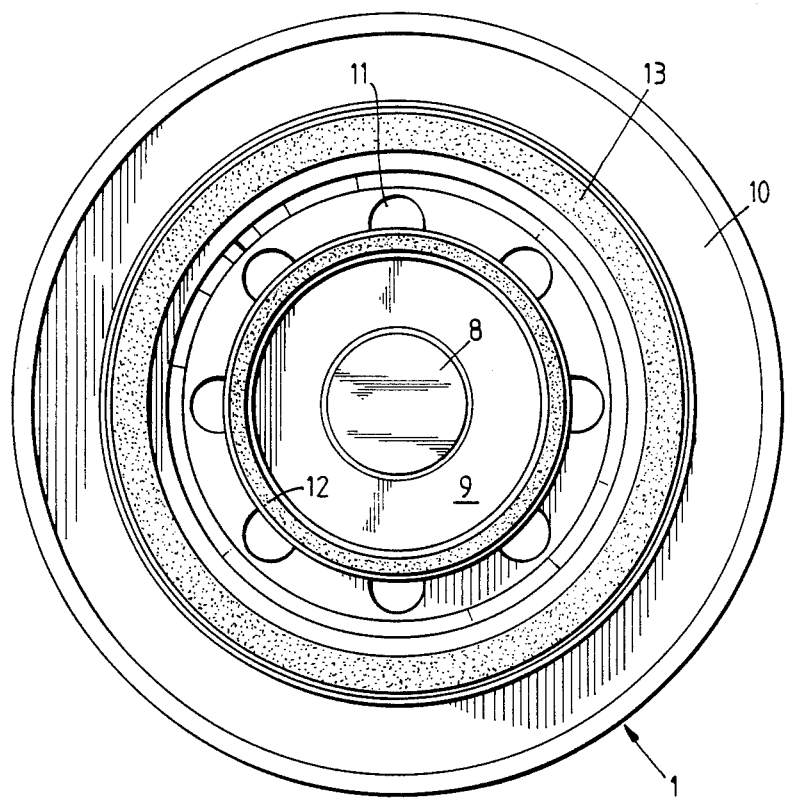
FIG. 2 is a plan view thereof.

From said figures it can be seen that the filter unit consists of a cup 1 into which two filter cartridges 2 and 3 respectively are inserted one above the other. The cartridge 2 is supported by a lower plate 4 supported by the base of the cup by way of a spring 5, whereas the upper cartridge 3 is pressed downwards by an upper plate 6 provided with a central hole. A perforated tube 7 extends centrally downwards from the plate 6. The plate 6 is pressed downwards by an elastic gasket 66 placed between the plate 6 and an upper plate 9 with a central threaded hole 8. The upper plate 9 is maintained in position by an upper shaped cover 10 which is clinched to the cup 1. In addition to the central threaded hole, the upper plate 9 and cover 10 comprises a series of circumferential holes 11 through which the oil arriving from the pump is fed into the filtering device. On entering through the holes 11 the oil flows into the interspace between the two filter cartridges 2 and 3 and the cup 1 and passes radially through said filter cartridges to flow into the central tube 7 and from there, through the threaded hole 8, to the engine lubrication duct. According to the present invention, about the filter cartridge 3, which is formed of fine porosity material, there is disposed a further concentric filter cartridge 33 formed of coarser porosity material, the porosity of the filter cartridge 2 being intermediate between that of the filter cartridge 3 and that of the filter cartridge 33.

By way of example, the cartridge 2 is preferably formed of paper with a porosity of between 10 and 30 microns, and the cartridge 3 is of paper with a porosity of between 4 and 15 microns, whereas the cartridge 33 is of non-woven fabric with a porosity of between 40 and 80 microns. The filter materials can generally be chosen from the following: paper-felt, non-woven fabric, cotton, synthetic fibers, or glass fibers, either single, paired, plaited, rolled up or punched.

A normal anti-emptying tube 99 extends from the center of the plate 9, and a usual safety valve 44 is provided at the center of the plate 4.

The operation of the filter is such that the oil fed through the holes 11 reaches the interspace about said filter cartridges where it splits between the two cartridges, with the larger fraction passing through the filter cartridge of lesser resistance, i.e. the filter cartridge 2, until this latter is clogged to such an extent that the resistance to the passage of the oil to be filtered becomes comparable to that offered by the two cartridges 3 and 33 in series. At this point the oil begins to also traverse the pair of cartridges 3 and 33 to a substantial extent and thus undergoes very fine filtration, which it is able to accomplish until the filter is completely clogged.

It will be noted that with the described configuration, the mixing of a flow of oil undergoing medium filtration with a smaller flow of oil undergoing fine filtration is statistically obtained directly within the filter unit instead of within the engine sump as occurs in the case of normal mixed circuit filters.

The presence of the coarse porosity filter cartridge 33 sufficiently delays complete clogging of the fine porosity filter 3 cartridge in the sense that it retains the larger size impurities and makes the filter life acceptable.

It will also be noted that above the shaped cover 10 there are located the seats of two annular gaskets 12 and 13 which ensure perfect sealing of the filter unit against the engine block and creates between them an annular region into which the feed ducts open, whereas those ducts for recirculating the oil directly to the sump which are provided in engines designed to accept mixed-circuit filter units, open into a sealed blind region within the gasket 12. These ducts are thus excluded from the oil circuit with the result that the filter unit heretofore described can be applied both to engine blocks designed for full-flow filter units and to engine blocks designed for mixed-circuit filter units.

The present invention is not limited to the embodiments heretofore described and modifications and improvements can be made thereto without departing from the scope of the invention, the basic characteristics of which are summarised in the following claims.

I claim:

1. A disposable oil filter unit for the filtration of oil and containing triple filtration within a closed container which comprises
   first and second filter cartridges having outside and inside surfaces and disposed within said closed container such that the oil flow traverses said first and second filter cartridges in parallel from the outside surfaces to the inside surfaces thereof, said first filter cartridge being confronted by a third filter cartridge disposed in front of and in series with said first filter cartridge, said first filter cartridge having a finer porosity than said third filter cartridge and said second filter cartridge having a porosity intermediate that of said first and third filter cartridges.

2. The disposable oil filter unit of claim 1, wherein the first cartridge has a porosity of between 4 and 15 microns.

3. The disposable oil filter unit of claim 2, wherein the first filter cartridge is paper.

4. The disposable oil filter unit of claim 1, wherein the second cartridge has a porosity of between 10 and 30 microns.

5. The disposable oil filter unit of claim 4, wherein the second filter cartridge is paper.

6. The disposable oil filter unit of claim 1, wherein the third cartridge has a porosity of between 40 and 80 microns.

7. The disposable oil filter unit of claim 6, wherein the third filter cartridge is unwoven fabric.

8. The disposable oil filter unit of claim 1, the casing being provided with a cover having an inlet and outlet means, wherein on said cover are provided two concentric annular gaskets which define a blind region between the more inner annular gasket and the oil outlet means of the filter, and a region containing said inlet means between the two annular gaskets.

9. The disposable oil filter unit of claim 1, wherein the first and second filter cartridges are disposed in an end-to-end stacked configuration and the third filter cartridge is concentrically disposed with respect to said first filter cartridge whereby the oil to be filtered passes radially through the first and third filter cartridges and through the second filter cartridge from the outside surfaces to the inside surfaces thereof.

* * * * *